H. L. PITMAN.
COMBINED TYPEWRITING AND COMPUTING MACHINE.
APPLICATION FILED JUNE 22, 1917.

1,359,270.

Patented Nov. 16, 1920.
6 SHEETS—SHEET 1.

Witnesses:

Inventor:
Henry L Pitman
by O. C. Stickney
Attorney

H. L. PITMAN.
COMBINED TYPEWRITING AND COMPUTING MACHINE.
APPLICATION FILED JUNE 22, 1917.

1,359,270.

Patented Nov. 16, 1920.
6 SHEETS—SHEET 2.

Witnesses:
Andrew A. Johnson
Julius Duckstine

Inventor:
Henry L. Pitman
by D.C. Stickney
Attorney

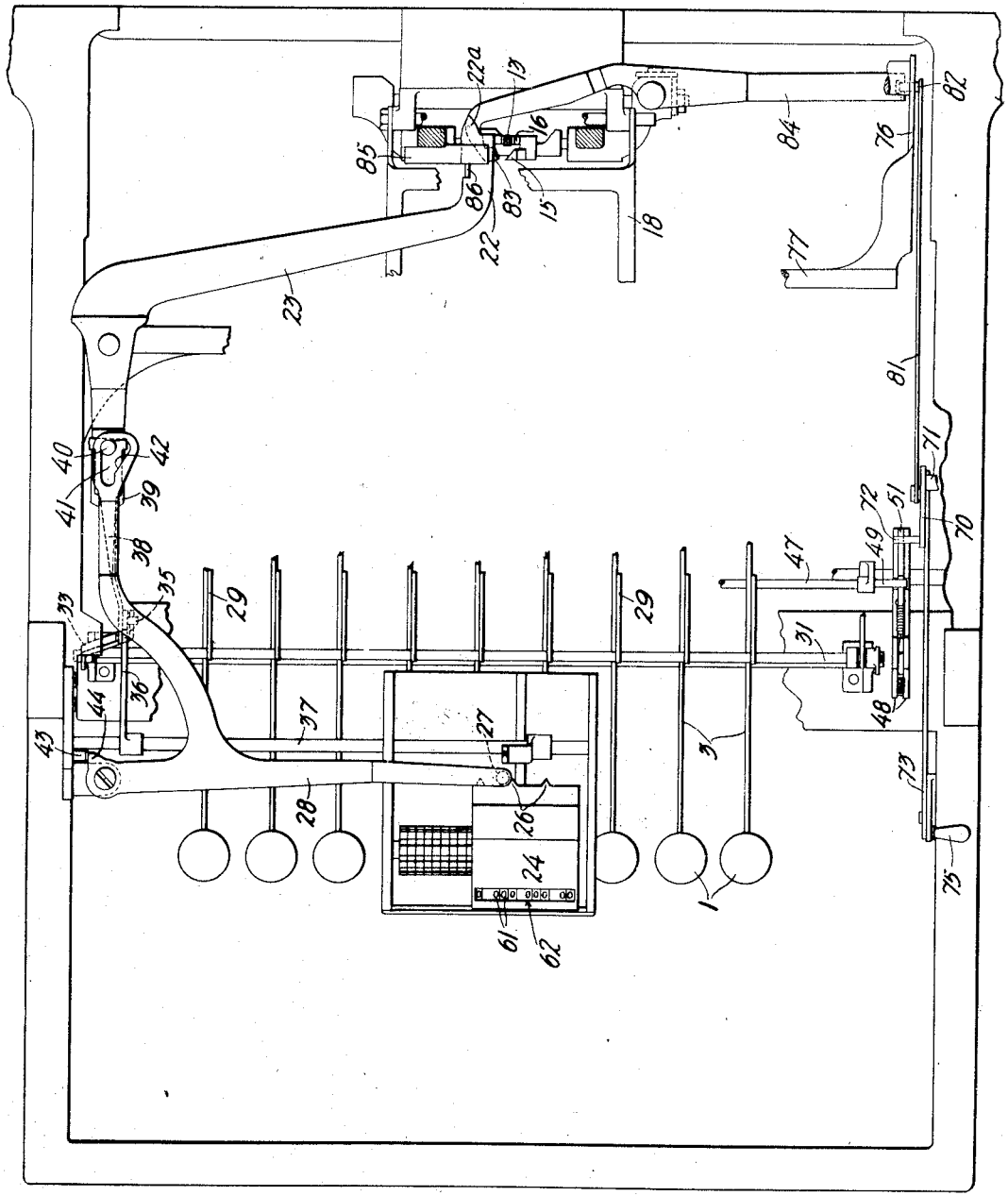

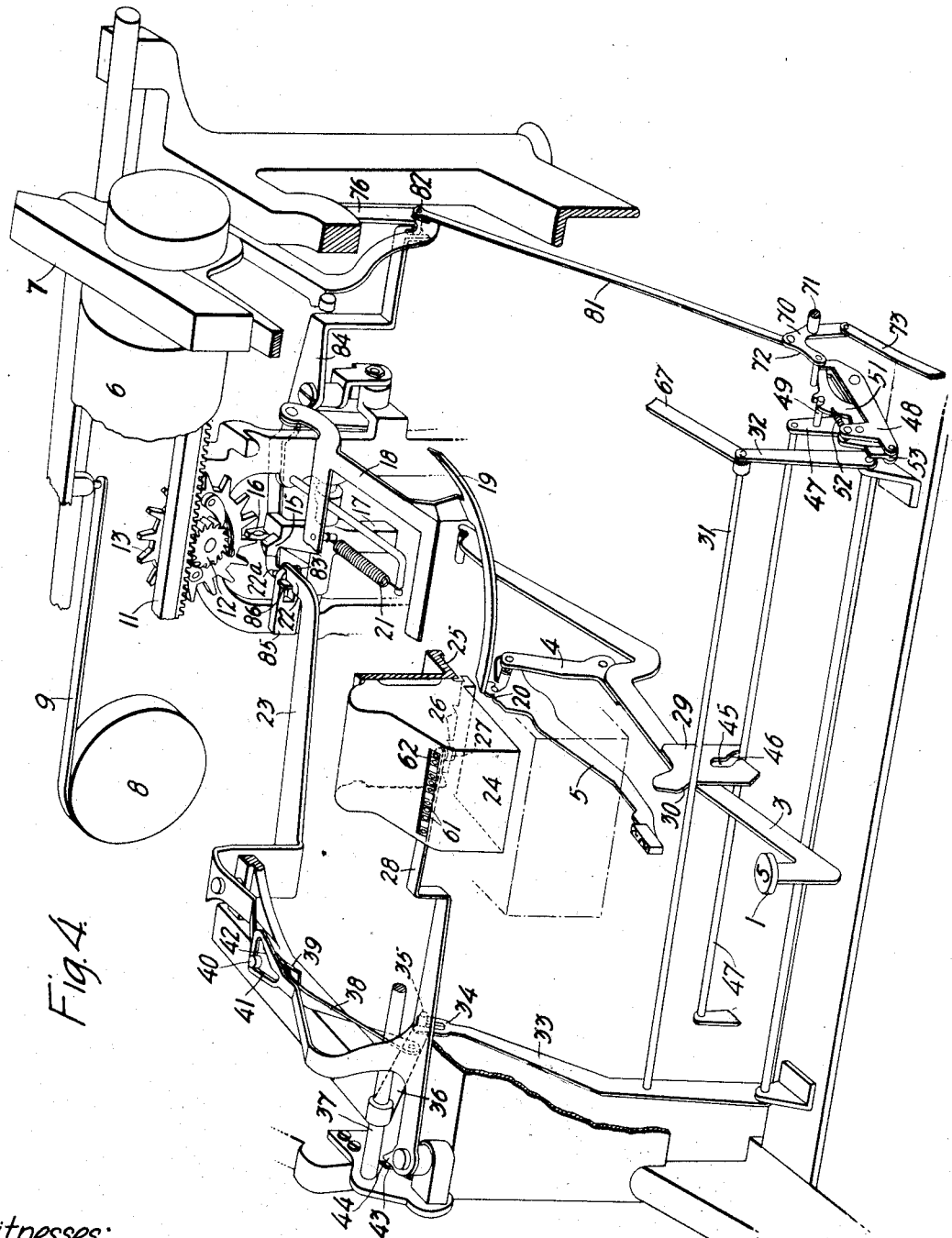

H. L. PITMAN.
COMBINED TYPEWRITING AND COMPUTING MACHINE.
APPLICATION FILED JUNE 22, 1917.
1,359,270.
Patented Nov. 16, 1920.
6 SHEETS—SHEET 5.
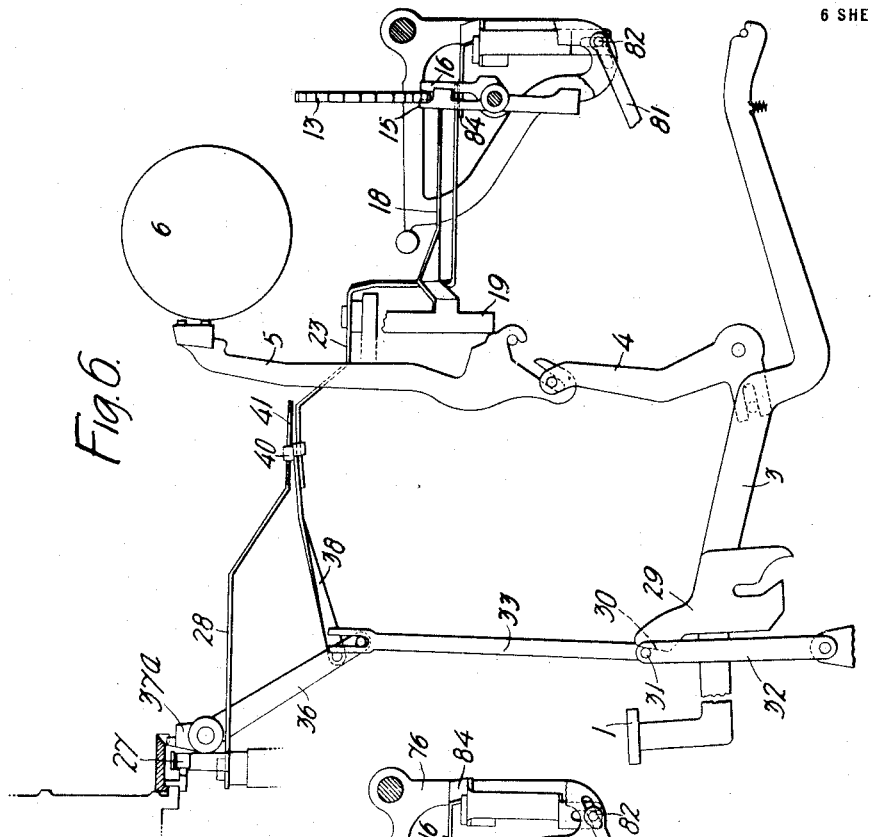
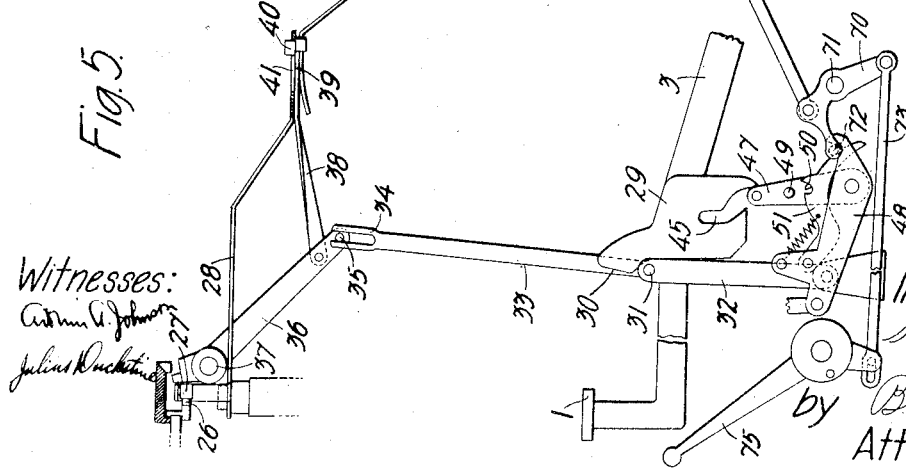

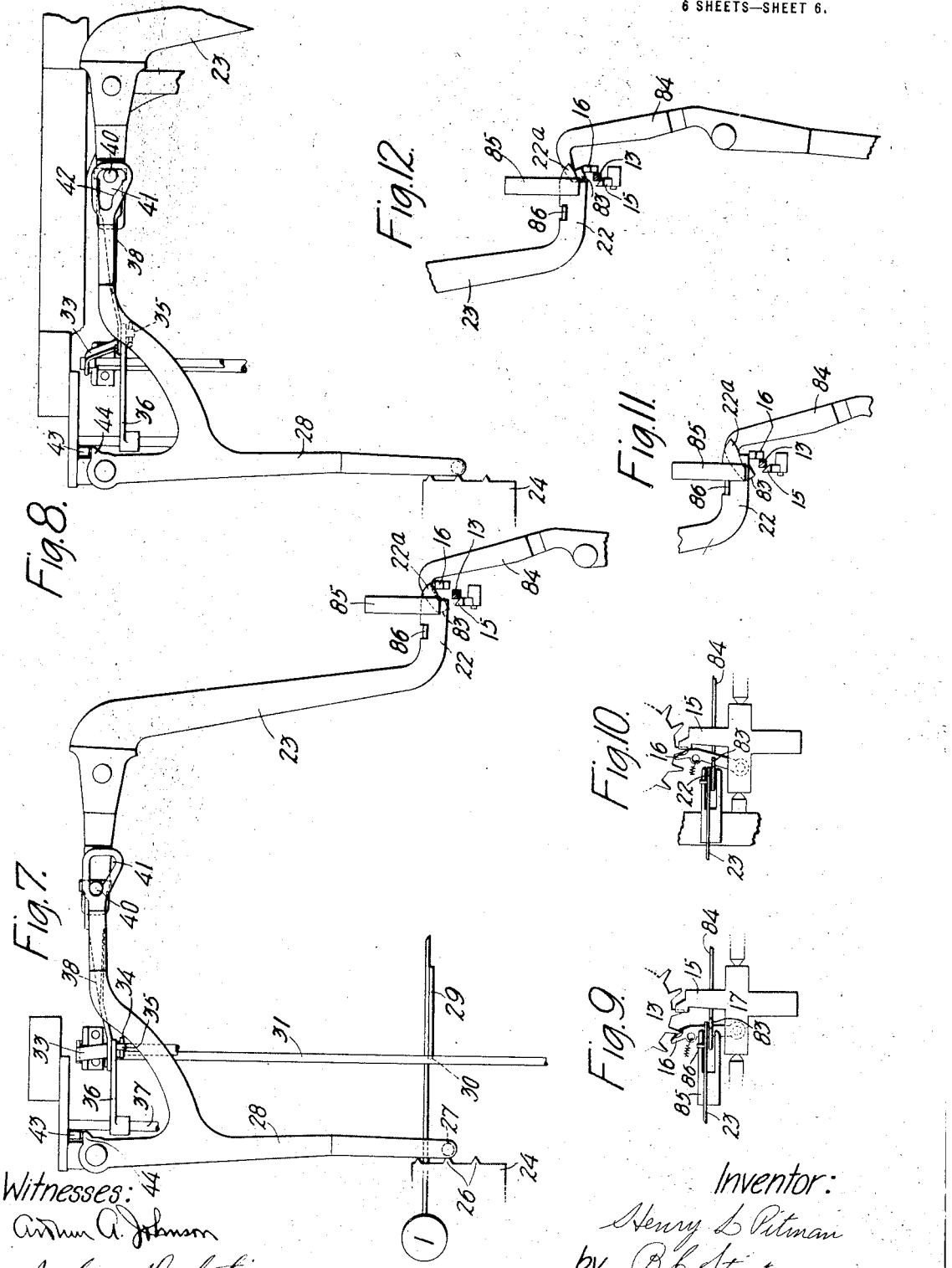

UNITED STATES PATENT OFFICE.

HENRY L. PITMAN, OF EAST ORANGE, NEW JERSEY, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,359,270.  Specification of Letters Patent.  Patented Nov. 16, 1920.

Application filed June 22, 1917. Serial No. 176,303.

*To all whom it may concern:*

Be it known that I, HENRY L. PITMAN, a citizen of the United States, residing in East Orange, in the county of Essex and State of New Jersey, have invented certain new and useful Improvements in Combined Typewriting and Computing Machines, of which the following is a specification.

This invention relates to a combined typewriting and computing machine, and more especially to means for insuring the proper punctuation-spacing of the digits as written and computed between millions and thousands, thousands and hundreds, and dollars and cents.

The present improvement is applied to a computing machine of key-driven type, more particularly described in my applications, No. 24,390, filed April 28, 1915, (now Patent No. 1,308,506, dated July 1, 1919), and No. 81,574, filed March 2, 1916, and in the application of Frederick A. Hart, No. 88,982, filed April 5, 1916, (now Patent No. 1,302,159, dated April 29, 1919). The spacing of the groups of digits is obtained by giving the typewriter carriage, which controls both the computing and typewriting spacing, an extra letter-space or digit-column movement after units of millions, units of thousands and units are written and computed. That is to say, a space is automatically skipped in the printing and computing at the punctuation-spaces. This is done by controlling the typewriter escapement, to give the extra space movements, from the traveling element of the computing mechanism with the aid of numeral-key-actuated mechanism.

This extra space control is arranged so that it will operate only when the punctuation-space is determined by the traveling element of the computing mechanism and when a numeral key is depressed, thus enabling the numeral keys to be operated with a regular step-by-step movement of the carriage outside of a computing zone, and enable typewriting with the alphabet keys in a quondam computing zone also with a regular step-by-step movement of the carriage. This is accomplished by numeral keys, when actuated, acting jointly with a set of cams on the traveling totalizer to withdraw a limiting member from the path of the loose dog of the escapement mechanism, permitting it to move a distance sufficient to allow a two-tooth movement of the escapement wheel instead of one.

When the computing mechanism is silenced or disconnected in a manner customary with this machine, provision is made to prevent the extra spacing movement of the carriage, even though the traveling element of the computing mechanism should be in a computing zone, and numeral keys should be operated at the same time. A supplementary blocking control is provided, operated from the computing silencing mechanism, to prevent the extra movement of the carriage.

It has been found advantageous to connect the interponent which renders the stop-carrying pawl or lever effective with the carriage lock in such a way that the initial movement of a pivoted bail, engaged by the numeral keys, will actuate the carriage lock. A continued movement of the bail, if the carriage is at this time in a position one letter-space in advance of a skipping position, will be effective to swing the stop-carrying lever to its double-space permitting position.

Other features and advantages will hereinafter appear.

In the accompanying drawings.

Fig. 3 is a skeleton plan view, showing the connections for controlling the extent of movement of the escapement mechanism, from the totalizer. This view shows the arm coöperating with the totalizer in a position to be engaged thereby to assist in withdrawing the escapement blocking arm to a two-step position, none of the numeral keys operated, and the arm still in a position limiting the escapement movement to one letter-space.

Fig. 4 is a skeleton perspective view, with the frame broken away to show the underlying structure, showing the connection from the totalizer to the escapement mechanism for controlling the extra letter-space movement, and also means for enabling the numeral keys to determine this connection, the parts being shown in their unactuated positions.

Fig. 5 is a detail view, showing the control from the totalizer actuated and ready to withdraw the obstructing arm to permit an extra letter-space movement, before the numeral key, however, has been operated, the computing mechanism having been silenced and the blocking toe, controlled therefrom, moved, to its effective position to permit only single space movements of the carriage.

Fig. 6 is a view, similar to Fig. 5, after the numeral key has been operated to withdraw the obstructing arm, the blocking toe having been previously moved back to its ineffective position.

Fig. 7 is a detail top plan view, showing the obstructing arm, which is controlled from the totalizer and is operated by the numeral key, as having been shifted to an extra letter-space-permitting position, as when in a space previous to a punctuation, and when the numeral key has been operated to print the final digit of a group.

Fig. 8 is a view similar to Fig. 7, except that the numeral key is unactuated, so that no extra letter-space movement will take place.

Fig. 9 is a detail view, in front elevation, showing the loose dog and the escapement mechanism as operated for an extra letter-space movement.

Fig. 10 is a view similar to Fig. 9, except that the loose dog has been operated but for a single letter-space movement.

Fig. 11 is a detail view of the blocking toe controlled from the computing-silencing mechanism and the case-shift mechanism, showing the same in its passive position, so that the escapment may or may not have an extra letter-space movement dependent upon the position of the other obstructing member.

Fig. 12 is a view of the parts shown in Fig. 11, except that the computing mechanism has been silenced, and the blocking toe, controlled therefrom, moved to its interfering position, permitting but a single letter-space escapement movement at a time.

Figure 2:
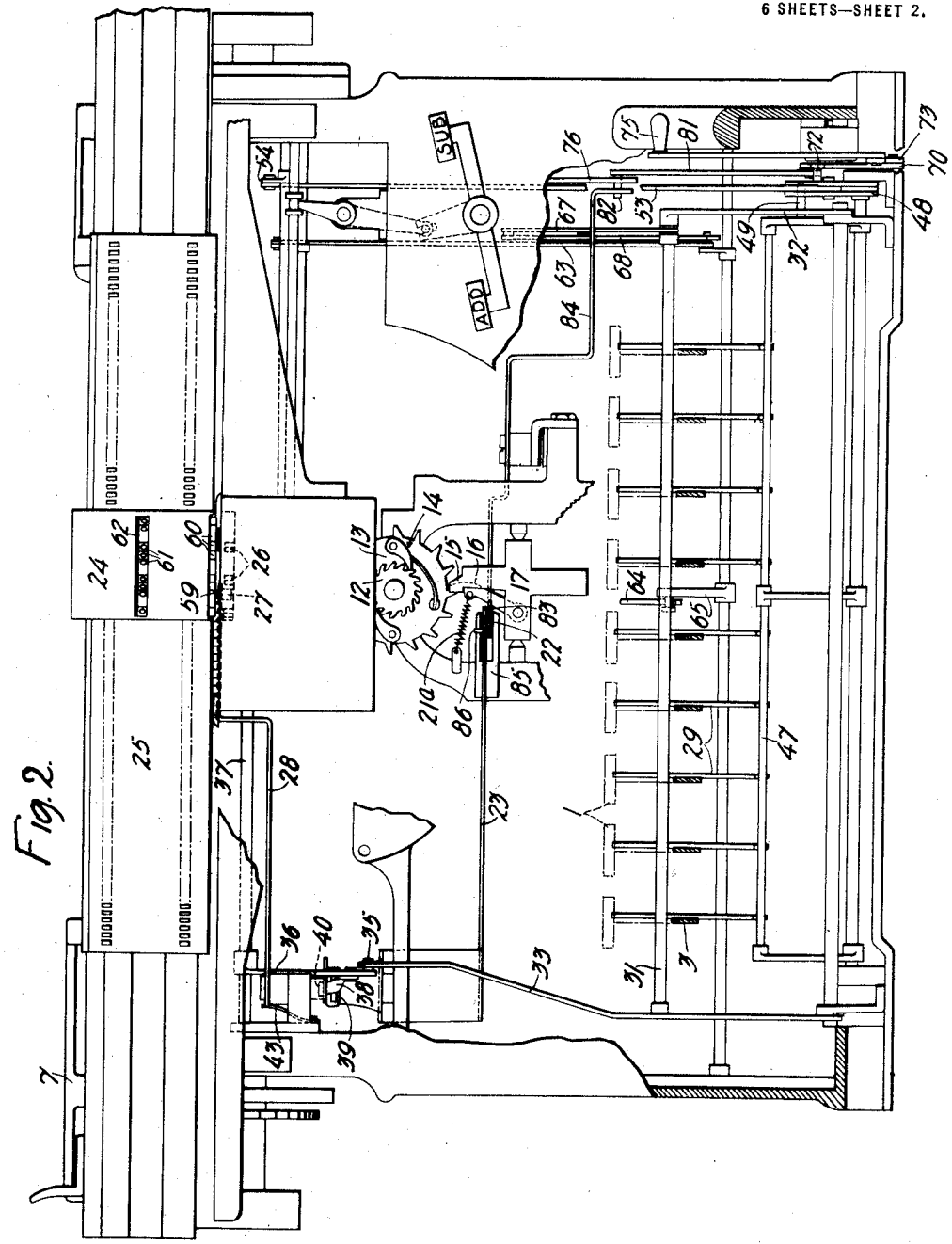
Fig. 2 is a front view in elevation, with parts omitted to simplify the showing, and parts broken away to show the underlying structure.

Numeral keys 1 and alphabet keys 2 depress key levers 3 to rock bell cranks 4, so as to swing type-bars 5 up rearwardly against the front side of a platen 6 mounted to rotate on a carriage 7. The carriage 7 is given a step-by-step movement by a spring barrel 8 connected thereto by a flexible band 9 (Fig. 4). The step-by-step movement of the carriage is controlled from the numeral keys 1 and alphabet keys 2 at the actuation of each. For this purpose, there is pivotally mounted on the carriage 7, by means of arms 10, a rack 11 which may move out of engagement with a pinion 12, with which it normally meshes. The pinion 12 controls the movement of the carriage, which in turn is controlled in its rotation by means of an escapement wheel 13 to which it is connected by a pawl-and-ratchet mechanism 14 (Fig. 2). The escapement wheel 13 is permitted to have an intermittent movement by means of a fixed dog 15 and a loose dog 16, mounted to oscillate with a rocker 17. The rocker 17 is operated by a universal frame 18 having a bail 19 universal to heels 20 provided on each of the type-bars 5.

When a character key is operated, it presses the universal bail 19 rearwardly against the tension of a spring 21, so as to disengage the loose dog 16 from one of the teeth of the escapement wheel 13, at the same time bringing into engagement with the escapement wheel the fixed dog 15. The loose dog 16 is advanced by a spring $21^a$, under ordinary conditions, enough to bring the loose dog into the range of the next succeeding tooth of the escapement wheel 13 from the one which the loose dog has just escaped. When the character key returns to its normal position, the loose dog catches the escapement wheel 13, permitting it to rotate one step, so as to give a one letter-space or digit column movement to the carriage 7.

Ordinarily, the movement of the lose dog 16, under the pull of its spring $21^a$ is limited by the right-hand edge of an arm 22, so as to control but a single letter-space movement of the carriage at a time. If, however, a greater movement of the carriage is desired, the body portion of the arm 22 is withdrawn out of the path of the loose dog 16 by means of a lever 23, of which it forms a part. The loose dog 16 will be advanced by its spring $21^a$ until it comes into engagement with a step extension $22^a$ on the fore side of the arm 22. This distance is sufficient for the loose dog 16 to catch, instead of the next succeeding tooth, the second tooth from the one which has just escaped the loose dog 16.

With these conditions, the carriage will have a two-letter-space movement, so as to skip a punctuation space between millions and thousands, thousands and hundreds, and between dollars and cents. As this is used in connection with computing and typewriting mechanism combined, a part of the computing mechanism is used to control the position of the blocking arm 22. For this purpose, a totalizer 24 is used.

The totalizer 24 may be adjustably mounted on a computing carriage 25, which is secured to travel with the carriage 7. The totalizer 24 is provided with a plurality of cams 26, which are located so as to engage a cam follower 27 when writing and computing in the units of millions, units of thousands and units of dollars places. The follower 27 is mounted on a bell-crank lever 28, so as to rock the same when in these digit columns. The other arm of the bell-crank lever 28 is connected to assist in rocking the bell-crank lever 23 on which the blocking arm 22 is formed. The operation of the lever 23 from the lever 28 is not direct, however, so that unless the numeral keys are also actuated, the blocking arm 22 will remain in its one letter-space determining position. That is to say, the totalizer must not only be in position for the computing in the last digit columns in each group, but also one of the numeral keys must be operated in order to obtain the two-letter-space movement of the carriage.

To enable the numeral keys jointly with the lever 28 to lock the carriage against movement and to withdraw the blocking arm 22 from its limiting position, each of the numeral key levers 3 is provided with a plate 29, arranged, when actuated, to bring a cam 30 thereon into engagement with a cross-rod 31 of a bail 32 to rock the latter. The bail 32 has one of its side arms extending at 33 to engage, by means of a fork 34, with a pin 35 carried by an arm 36. The arm 36 is mounted on a shaft 37, so as to rock a pawl 37ᵃ thereon, in a vertical plane, to engage in notches formed by teeth 25ᵃ on the computing carriage 25. Connected to this arm 36, there is a link 38, which operates a slide 39 mounted on the bell-crank lever 23. The slide 39 is provided with a pin 40 which projects into a triangular slot 41, provided in one of the arms of the bell-crank lever 28.

It should be understood that the bail 32, by means of the upwardly-projecting arm 33, forms an extremely simple and direct connection to the carriage locking pawl 37ᵃ.

It should also be understood that the means for rendering effective the lowering mechanism for the driving rack 56 is actuated simultaneously with the interponent 38 which is connected to render the stop portion 22ᵃ of the stop-carrying lever 23 effective.

When none of the numeral keys are operated, the pin 40 occupies the position shown in Figs. 3, 4 and 8, so that there is no positive connection between the lever 23 and the lever 28. When writing in the last digit column of a group before a punctuation space, however, if the numeral key is operated, said pin 40 will engage a cam side 42 of the triangular slot 41, so as to rock the lever 23 to withdraw the blocking arm 22 from its normal obstructing position, Figs. 7 and 8. Obviously it is desirable to obtain the same action upon printing a "0" in the last digit column of a group before a punctuation space, and for this purpose the usual "0" key (not shown) may be provided with one of said cams 30 to engage cross-rod 31 of the bail 32. This permits the loose dog 16 to jump to the lower step 22ᵃ, catching the second escapement tooth beyond. In this way, the carriage is given an extra space or skipping movement when a digit is computed and written in the last digit column of each group. That is to say, in units of millions, units of thousands and units of dollars.

The bell crank 28 is returned after the carriage has advanced the totalizer, so as to clear the cam 26 from the follower 27 by means of a leaf spring 43, engaging a short arm 44 on the bell crank 28.

The operation of the computing mechanism to drive the dial wheels of the totalizer 24, is somewhat similar to that shown in the above-mentioned applications. That is to say, each of the plates 29, associated with the numeral keys 1, is provided with a slot 45 having a cam surface 46. The cam surfaces 46 are graded in their throw, so as to give variable movements to a bail 47, according to the value of the particular numeral key with which they are associated. In the present instance, the slots 45 are shown as having wide openings at their bottoms, so as to permit the unobstructed return movement of the bail 47 after the computing action.

The bail 47 may drive an actuator 48 by means of a pin 49 engaging a notch 50 in a floating interponent 51. Normally, the interponent is held by a spring 52 with its notch 50 in close engagement with the pin 49, so that the interponent moves with the bail 47, and thus operates the actuator 48 on which it is pivotally mounted. The actuator 48 is connected to draw down on a link 53, so as to rock a bell crank 54, which, in turn, swings forwardly, through the intermediary of a link 55, a driving rack 56.

The driving rack 56 is arranged to mesh with a gear 57 throughout the extent of its forward movement, so as to drive, through an intermediate gear train 58, a master wheel 59. The master wheel 59 is located beneath a series of computing wheels 60, which are arranged to drive a corresponding series of dial wheels 61, so that the numbers corresponding to the numeral keys actuated are exhibited through a sight-opening 62 in the casing of the totalizer 24.

The driving rack 56 is manipulated into and out of mesh with the gear 57 by means of a linkage 63, more particularly shown and described in my above-mentioned applications. This linkage is operated from the universal frame 18, by means of a bell crank 64 connected to the latter. The bell crank 64 operates another bell crank 65, which has a pin-and-slot connection 66 with the linkage 63. The operation of shifting into mesh the driving rack 56 is dependent on the actuation of a numeral key. Ordinarily with the actuation of merely an alphabet key, the pin-and-slot connection 66 will permit an idle rocking of the bell-crank 65. If, however, a numeral key is operated and the interponent 51 is rigidly connected to the bail 47, then a link 67, connected to the bail 32, is drawn on to rock a lever 68. The lever 68 is pivoted on the linkage 63 and brings a toe 69 into the path of the pin-and-slot connection 66, so as to cause the bell crank 65 to actuate the linkage 63.

When it is desired to silence the computing mechanism, the interponent 51 is disconnected from the pin 49 and thus from the bail 47, so that the latter swings idly without transmitting any computing action to the rest of the computing mechanism. To do this, there is provided a disconnector 70 pivoted at 71 and having a pin 72 to engage and release the interponent 51 against the tension of its spring 52. The disconnector 70 is rocked by means of a link 73, which has a pin-and-slot connection 74 with a hand lever 75. When the hand lever 75 is pulled forward, it will rock the disconnector 70 in counter-clockwise direction to silence the computing mechanism.

The computing mechanism may also be silenced from the means which enables the writing of characters other than numbers with the numeral keys. That is to say, the computing mechanism may be temporarily silenced by the case-shift mechanism. This case-shift mechanism is of the usual Underwood type and consists of a rock frame 76 having a shift rail 77 on which followers 78, mounted on the carriage 7, ride. The shift frame 76 is operated by either one of two case-shift keys 79, each of which is provided with an arm 80 to engage in back of the case-shift frame 76. The case-shift frame 76 is connected to disconnector 70 by a link 81, so that, when this frame is rocked to move the platen 6 into upper-case position, the disconnector 70 will be rocked to silence the computing mechanism.

The link 81 is connected by a pin-and-slot connection 82 with the case-shift frame 76, so that the hand lever 75 can operate the disconnector without operating the case-shift frame 76. The pin-and-slot connection 74, on the hand lever 75, permits the case-shift frame to operate the disconnector without operating the hand lever 75.

Figure 1:
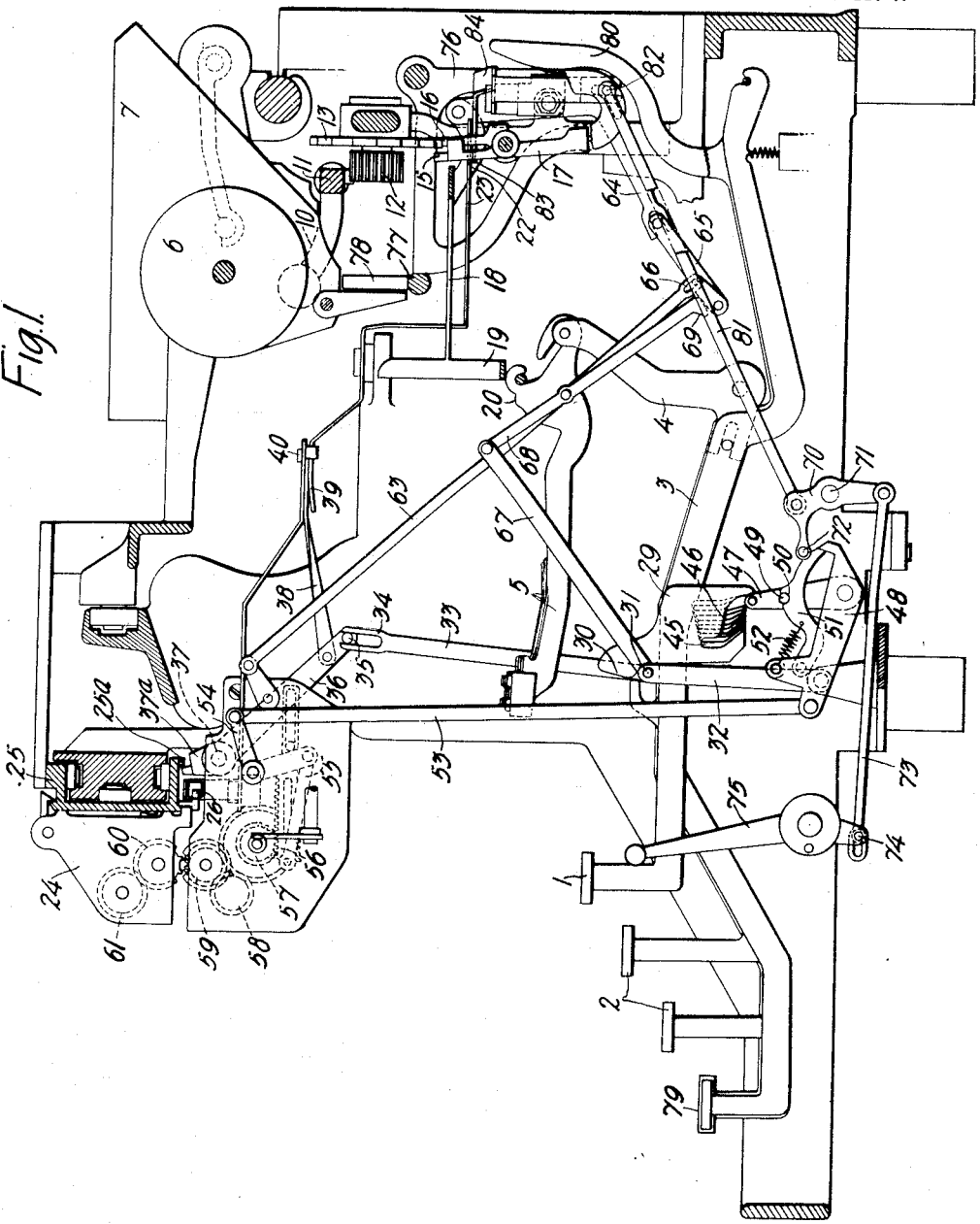
Figure 1 is a vertical section, taken from front to rear, with parts omitted to simplify the showing.

When the computing mechanism is silenced, either by the hand lever 75 or the case-shift frame 76, for permitting typewriting without computing, it is desirable that only regular step-by-step movements of the carriage shall take place with the operation of the character keys. It might happen, however, that the cams 26 would be in proper position and one of the numeral keys 1 operated, so as to withdraw the blocking arm 22. Provision is therefore made for placing an auxiliary blocking toe 83 in the path of the loose dog 16, so as to prevent more than a single letter-space escapement movement of the carriage. The blocking toe 83 is on a lever 84, which is connected to the pin of the pin-and-slot connection 82 (Fig. 1). Thus, when the disconnector 70 is operated to silence the computing mechanism, the lever 84 will be rocked to bring the blocking toe 83 into an obstructing position with respect to the loose escaped dog 16.

The arm 22 may be guided in its movement by a slotted bracket 85. The lever 23 has a lug 86 to engage the bracket 85, so as to limit the movement of the lever 23 and thus properly position the arm 22 relative to the escapement dog 16.

It will thus be seen that provision is made for automatically spacing at the punctuation spaces when effecting a combined typewriting and computing operation, but that this action will not take place unless a computing operation is going on, and unless the carriage is in a proper position for jumping the punctuation space when operating the numeral key.

Variations may be resorted to within the scope of the invention, and portions of the improvements may be used without others.

Having thus described my invention, I claim:

1. The combination with a traveling element, of escapement mechanism for controlling the feed of said traveling element, actuating means for said escapement mechanism including numeral keys, and means controlled jointly by said numeral keys and said traveling element for modifying the action of said escapement mechanism to produce skipping movements of said traveling element in addition to the regular step-by-step movement.

2. The combination with a traveling element, of an escapement mechanism controlling step-by-step movements of said traveling element, means including numeral keys for controlling said escapement mechanism directly, connections controlled jointly by said traveling element and said numeral keys indirectly for producing skipping movements of said traveling element, computing mechanism controlled by said numeral keys, silencing means for said computing mechanism and a device thrown into action by said silencing means to limit the movements of said traveling element to regular step-by-step movements.

3. In a combined typewriting and computing machine, the combination with combined typewriting and computing mechanism including numeral keys, a case-shift mechanism for enabling said numeral keys to typewrite characters other than digits, a traveling element moving step by step to determine the denominational selections, and escapement mechanism for said traveling element controlled directly by said numeral keys to give step-by-step movements to said traveling element, of means to cause skipping movements of said traveling element including normally ineffective connections with said numeral keys, and a control for said escapement mechanism governed from said case-shift mechanism to limit the movement of said traveling element to regular step-by-step movements.

4. The combination with a traveling element, of an escapement mechanism controlling step-by-step movements of said traveling element, means including alphabet and numeral keys for controlling the action of said escapement mechanism, and an independent connection to said escapement mechanism from said numeral keys solely for giving an extra step or skipping movement to said traveling element.

5. The combination with a traveling element, of an escapement mechanism for controlling step-by-step movements of said traveling element, means including numeral and alphabet keys for operating said escapement mechanism, and means dominated by the numeral keys independently of the alphabet keys for increasing the magnitude of movement of said traveling element automatically at predetermined intervals by manipulating said escapement mechanism.

6. In a combined typewriting and computing machine, in combination, printing mechanism including alphabet and numeral keys, computing mechanism operatively connected to said numeral keys, a traveling element, step-by-step feeding means for said traveling element actuated by said alphabet and said numeral keys, and means controlled by said traveling element and said numeral keys to give additional feeding movements to said traveling element in order to provide punctuation spaces in printing the numbers to be computed.

7. The combination with a traveling element, of an escapement mechanism for controlling step-by-step movements of said traveling element, a series of cams on said traveling element arranged at predetermined intervals, a bell crank operated by said cams, another bell crank controlling said escapement mechanism, numeral keys operating said escapement mechanism, and interponent mechanism controlled by said numeral keys, enabling said keys and said cams to effect a movement of said second-mentioned bell crank with the aid of said first-mentioned bell crank, so as to modify the movement of said traveling element under the control of said escapement mechanism.

8. The combination with a traveling element, of an escapement mechanism for said traveling element including a pair of dogs, a blocking arm normally interposed in the path of one of said dogs, so as to limit the movement thereof and thus limit the movement of said traveling element, a bell crank supporting said arm, another bell crank operated from said traveling element, a slot in one of said bell cranks, and a pin slidably mounted on the other of said bell cranks determining, by its position in said slot, whether said blocking arm shall be in its obstructing position, or in a cleared position to prevent an extra movement of said escapement and of said traveling element.

9. The combination with a traveling element, of an escapement mechanism controlling movements of said traveling element, a blocking arm normally limiting the extent of movement of said escapement mechanism to one step and thus the extent of movement of said traveling element to one step, a bell crank on which said arm is mounted, a slide adjustably mounted on said bell crank, a pin mounted on said slide, a second bell crank, having a cam slot opening in which said pin projects, a series of cams arranged at predetermined intervals on said traveling element acting to rock said second-mentioned bell crank, numeral keys operating said escapement mechanism, and a linkage universal to said numeral keys, so as to be operated thereby, acting to shift said slide to enable the adjustment of said blocking arm between one step and two step positions.

10. The combination with a traveling element, of an escapement mechanism for controlling the feed of said traveling element, numeral keys, numeral-key-actuated devices to which the escapement mechanism is universal, skipping mechanism for said escapement mechanism, normally ineffective operating means for said skipping mechanism universal to said numeral keys, and means controlled by said traveling element to render effective the operating means for said skipping mechanism.

11. The combination with a traveling element, of an escapement mechanism for said traveling element, computing mechanism associated with said traveling element, numeral keys for operating said computing mechanism and said escapement mechanism, means including connections with said numeral keys for varying the action of the escapement mechanism, disconnecting means for rendering said computing mechanism inactive, and obstructing means coöperating with said escapement mechanism to limit the extent of the separate spacing movements of said traveling element, brought into play by said disconnecting means.

12. The combination with a traveling element, of numeral keys, numeral key-actuated escapement mechanism for controlling the movement of said traveling element, including a fast and a loose dog, a blocking member normally positioned to limit the movement of the loose dog, so as to limit the movement of said traveling element to one step, but movable to a position to enable positioning of said loose dog to permit a double-step movement, a cam member, means actuated by said traveling element to move said cam member to effective position for certain positions of said traveling element, a slide on said blocking member, and numeral key-actuated means to move said slide into engagement with said cam member when the latter is in effective position, and consequently effect movement of said blocking member to permit a double-step movement of said traveling element.

13. In combination, a traveling carriage, printing keys, key-actuated step-by-step feeding mechanism for said carriage, means for locking said carriage against movement during a printing operation comprising a bail with an arm thereon, a rock-shaft, an arm projecting from said rock-shaft and engaging with the arm on said bail, a pawl on said rock-shaft, a member mounted on said carriage coöperating with said pawl to form a locking connecton, means associated with certain of said keys to actuate said bail, and means whereby actuation of said bail, when the carriage is in certain predetermined positions, will effect an increased step movement of said carriage.

14. The combination with a traveling element and printing keys, of step-by-step feeding means for said traveling element, key-actuated locking means for said traveling element to prevent movement during a printing operation, and means controlled by said traveling element and actuated by said key-actuated locking means for permitting double-space movements at predetermined positions along the path of travel of said traveling element.

15. The combination with a traveling element, of an escapement mechanism controlling step-by-step movements of said traveling element, actuating means for said escapement mechanism including numeral keys, normally effective numeral-key-actuated means for producing skipping movements of said traveling element, and means controlled by said traveling element for rendering effective said numeral-key-actuated means for producing skipping movements.

16. In a combined typewriting and computing machine, the combination with a carriage and numeral keys, of an escapement mechanism for controlling step-by-step movements of said carriage, a traveling totalizer controlled by said carriage, a stop-carrying element coöperating with said escapement mechanism, an element controlled by said totalizer and movable independently of said stop-carrying element, and an interponent engaging with the element engaged by said totalizer and with said stop-carrying element, said interponent being actuated by the numeral keys to shift said stop-carrying element.

17. The combination of a traveling element, step-by-step feeding mechanism therefor, actuating means for said step-by-step feeding mechanism including numeral keys, a controlling device for said step-by-step feeding mechanism to cause feed movements of increased length, connections between said numeral keys and said controlling device normally ineffective to actuate said controlling device, and means controlled by said traveling element for rendering said connections effective.

18. In combination, a traveling carriage, feeding mechanism therefor, including numeral keys, a controlling device for said feeding mechanism to determine single or double letter-space movements of said carriage, normally set to give single letter-space movements, and means controlled by said carriage and actuated by said numeral keys to cause double letter-space movements of said carriage.

19. In combination, a traveling element, step-by-step feeding means therefor, actuating means for said feeding means including numeral keys, locking means for said traveling element, means for causing increased feeding movements of said feeding means made effective by the traveling element in certain positions, and a numeral-key-actuated device for first actuating said locking means and thereafter causing increased movements of the feeding means when the means for causing increased movements is rendered effective by the traveling element.

20. The combination with a traveling carriage, of escapement mechanism for controlling the step-by-step movements of said traveling carriage, means, including alphabet and numeral keys, for actuating said escapement mechanism, and means effective only in certain predetermined positions of said carriage, whereby actuation of a numeral key, when said carriage is in any one of said predetermined positions, will effect a step movement of different magnitude from that effected upon actuation of an alphabet key when said carriage is in the same position.

21. The combination with a traveling carriage, of an escapement mechanism for effecting uniform step-by-step movements of said carriage, means, including keys, for actuating said escapement mechanism, and means effective only in predetermined positions of said carriage, whereby actuation of certain of said keys will effect step movements of different lengths from those resulting from the actuation of other of said keys.

22. The combination with a traveling element, of escapement mechanism for feeding said traveling element by step-by-step movements of uniform length, means, including keys, for actuating said escapement mechanism, and means controlled jointly by said traveling element and certain of said keys for modifying the action of said escapement mechanism, so as to produce step movements of abnormal length.

23. The combination with a traveling carriage, of a step-by-step feeding mechanism therefor, including keys, a controlling device for said feeding mechanism normally set to cause step movements of a given length, and means, controlled by said carriage and actuated by certain of said keys, to effect step movements of a different length.

HENRY L. PITMAN.

Witnesses:
 EDITH B. LIBBEY,
 ARTHUR A. JOHNSON.